(12) United States Patent
Pfeiff

(10) Patent No.: US 11,116,185 B2
(45) Date of Patent: Sep. 14, 2021

(54) FEEDER

(71) Applicant: Nordic Gamekeeper AB, Slöinge (SE)

(72) Inventor: Carl Pfeiff, Slöinge (SE)

(73) Assignee: NORDIC GAMEKEEPER AB, Slöinge (SE)

( * ) Notice: Subject to any disclaimer, the term of this patent is extended or adjusted under 35 U.S.C. 154(b) by 127 days.

(21) Appl. No.: 16/495,989

(22) PCT Filed: Feb. 16, 2018

(86) PCT No.: PCT/EP2018/053897
§ 371 (c)(1),
(2) Date: Sep. 20, 2019

(87) PCT Pub. No.: WO2018/171989
PCT Pub. Date: Sep. 27, 2018

(65) Prior Publication Data
US 2020/0045942 A1   Feb. 13, 2020

(30) Foreign Application Priority Data
Mar. 22, 2017   (SE) ................................... 1750340-0

(51) Int. Cl.
*A01K 61/80*  (2017.01)
*A01K 5/02*   (2006.01)

(52) U.S. Cl.
CPC ............... *A01K 61/80* (2017.01); *A01K 5/02* (2013.01)

(58) Field of Classification Search
CPC ...... A01K 61/80; A01K 61/85; A01K 5/0225; A01K 5/02; A01K 5/0275
See application file for complete search history.

(56) References Cited

U.S. PATENT DOCUMENTS

| 3,742,913 A | 7/1973 | Crippen |
| 4,027,627 A | 6/1977 | Fillion |

(Continued)

FOREIGN PATENT DOCUMENTS

| CN | 103875579 A | 6/2014 |
| DE | 408264 C | 1/1925 |

(Continued)

OTHER PUBLICATIONS

International Search Report and Written Opinion dated May 24, 2018, issued in corresponding International Application No. PCT/EP2018/053897, filed Feb. 16, 2018, 11 pages.

(Continued)

*Primary Examiner* — Joshua D Huson
*Assistant Examiner* — Abigail L Rydberg
(74) *Attorney, Agent, or Firm* — Christensen O'Connor Johnson Kindness PLLC

(57) ABSTRACT

The disclosure relates to a feeder (1) for spreading feed, the feeder (1) comprising a housing (10) having an upper feed compartment (11) and a lower feed compartment (12), and a partition wall (16) between the upper feed compartment (11) and the lower feed compartment (12), the partition wall (16) comprising an upper plate (21), a lower plate (22) and a disc (23) with through-going openings (21a-c, 22a-c, 23a-d), the feeder further comprising a spreader motor (50), a rotatable spreader plate (54), a spreader shaft (52) between and connected to the spreader motor (50) and to the rotatable spreader plate (54), the spreader shaft (52) extending at least partly through the lower feed compartment (12) and a lower agitator (60) being positioned inside the lower feed compartment (12) and being connected to and extending from the spreader shaft (52) such that when the spreader shaft (52) is rotated the lower agitator (60) will sweep around the second axis (A2) inside the lower feed compartment (12).

14 Claims, 5 Drawing Sheets

(56) References Cited

U.S. PATENT DOCUMENTS

| | | | | |
|---|---|---|---|---|
| 4,353,329 | A * | 10/1982 | Thibault | A01K 5/0241 |
| | | | | 119/52.1 |
| 9,295,226 | B2 * | 3/2016 | Brooks | A01K 5/0291 |
| 10,653,110 | B2 * | 5/2020 | Pfeiff | A01K 5/0291 |
| 2008/0178814 | A1 | 7/2008 | Tseng | |
| 2010/0095895 | A1 * | 4/2010 | Laliberta | A01K 5/0275 |
| | | | | 119/56.1 |
| 2020/0396959 | A1 * | 12/2020 | Bahr | A01K 5/0291 |

FOREIGN PATENT DOCUMENTS

| | | |
|---|---|---|
| EP | 0 920 795 A2 | 6/1999 |
| FR | 2 597 713 A1 | 10/1987 |
| FR | 2 971 119 A1 | 8/2012 |
| JP | 55-85338 A | 6/1980 |
| KR | 10-2013-0000145 A | 1/2013 |

OTHER PUBLICATIONS

Swedish Search Report dated Nov. 28, 2017, issued in corresponding Swedish Application No. 1750340-0, filed Mar. 22, 2017, 2 pages.

* cited by examiner

FEEDER

FIELD OF INVENTION

The invention relates to a feeder for spreading feed. The invention is especially applicable in spreading feed over fish ponds or fish tanks, shrimp ponds or shrimp tanks, or the like, in commercial farming of fish, shrimps or the like.

TECHNICAL BACKGROUND

Feeders, such as game feeders of various kinds are known in the art.

WO 2015/144763 A1 e.g. discloses a game or fish feeder having a feed container be provided with a feed outlet at the bottom of the feed container. The feed outlet may be provided with a lid or stop which may selectively be arranged in front of the outlet so as to prevent feed from passing through the outlet. The feeder further comprise a spreader, which is arranged to receive and spread feed from the feed outlet. Hence, the feed passing through the outlet may by means of the spreader be dispersed in an area around the feeder. The spreader may be selectively actuated so as to control when feed is to be dispersed from the system.

US2015334989A e.g. discloses a game feeder including a gravity feed hopper with a lower opening through which granular feed flows through and onto a spinner plate. The spinner plate accelerates the falling feed radially outward from the plate to spread the feed for animals to retrieve from the ground. The spinner plate is rotated by an electric motor and control unit. Extending from the spinner plate is an elongated agitator extending upwards into the opening of the hopper. The agitator is threaded, and optionally offset from the centre of the spinner plate centre of rotation. The agitator contacts the granular feed to prevent clogging or clumping thereof, and ensures a uniform flow when the agitator is rotated.

Chinese Utility model CN204949084U discloses a fish breed pond with a feeding device including a feed bin, a page or leaf piece wheel, a servo motor and a discharge gate. By rotating the page or leaf piece wheel with a servo motor, the bait volume can be controlled to be different in different growth periods of the fish.

US2014116343A discloses a game feeder including a housing having a cavity, an input aperture, and an output aperture; a base attached to the housing; a spreader below the output aperture; and a motor, attached to the feeder and the spreader, and configured to rotate the spreader. Also disclosed is that the feeder can include a varmint guard disposed below the output aperture, such that the spreader is between the guard and housing, to minimize interference and/or damage to the spreader or feeder by a varmint.

JP1252235A discloses a feeder having a through feed taking hole on a rotary plate constituting the bottom of a feed box, equipping a feed discharge suppressing plate to take out a feed in an amount corresponding to the volume of the feed taking hole from a discharging pipe under the feed taking hole and setting an agitating plate on the rotary plate. A feed in an amount corresponding to a volume of a feed taking hole of a rotary plate constituting the bottom of a feed box is controlled by a feed discharge suppressing plate so as to take out the feed from a discharging pipe under the feed taking hole. An agitating plate extending in a radiate direction from the center is set on a rotary plate, the feed is agitated with an aim so as to uniformly discharge the feed and to thereby aim at an accurately controlled release and amount of the feed.

However, there is still room for improvements of the design of feeders. The feeder should preferably be designed to be energy-efficient to allow them to be battery powered. The feeder should preferably be designed to avoid and to tackle problems with clumping of the feed. The feeder should be capable of providing a correct amount of feed.

SUMMARY OF INVENTION

It is an object of the invention to provide an improved feeder which addresses at least some, and preferably all, of the design considerations mentioned above.

This object has been achieved by a feeder for spreading feed, the feeder comprising a housing having
 an upper feed compartment and
 a lower feed compartment,
 wherein the feeder is adapted to be loaded with feed in the upper feed compartment,
 the feeder further comprising a partition wall between the upper feed compartment and the lower feed compartment, the partition wall comprising
 an upper plate having at least one through-going opening,
 a lower plate having at least one through-going opening,
 and a disc having a height and at least one through-going opening, the disc being arranged between the upper and lower plates,
 whereby relative rotation between the upper and lower plates and the disc about a first axis oriented with a major component in a vertical direction allows feed to be transferred from the upper feed compartment to the lower feed compartment, wherein the feed is transferred to the through-going opening of the disc when the through-going opening of the disc at least partly overlaps with the through-going opening of the upper plate, wherein the feed is transferred to the lower feed compartment when the through-going opening of the disc at least partly overlap with the through-going opening of the lower plate,
 the feeder further comprising
 a spreader motor,
 a rotatable spreader plate arranged beneath a feed outlet from the lower feed compartment,
 a spreader shaft between and connected to the spreader motor and to the rotatable spreader plate, the spreader shaft extending at least partly through the lower feed compartment and being oriented to rotate about a second axis oriented with a major component in a vertical direction, and
 a lower agitator for feed agitation being positioned inside the lower feed compartment and being connected to and extending from the spreader shaft such that when the spreader shaft is rotated the lower agitator will sweep around the second axis inside the lower feed compartment.

By providing separation of the volume inside housing into an upper compartment and a lower compartment, it is possible to keep the supply of feed separate from the amount of feed that is intended to be spread at a given time. Thereby it is possible to design the parts of the feeder providing the portioning or amount control separately from the design of the parts of the feeder providing the desired spreading. Moreover, it becomes possible to completely empty the lower compartment by running the spreader motor for a sufficient time after the transfer of feed from the upper compartment has ended. This reduces the risk of moisture coming in contact with the feed which otherwise is a common cause for clump formation in the feed.

The partition wall with the upper plate, disc and lower plate serves a plurality of purposes.

First, by e.g. rotating the disc relative to plates being fixed relative to the housing a well-defined amount of feed will be transferred from the upper compartment to the lower compartment. Every time there will be an overlap between the opening in the upper plate and the opening in the disc a certain amount of feed will fill the volume formed inside the opening in the disc. Every time there will be an overlap between the opening in the disc and the opening in the lower plate, this amount of feed will fall into the lower compartment. It may be noted that in the preferred embodiment the disc is rotatable and both the upper and the lower plate are fixed relative to the housing. However, it is conceivable to use other set-ups where e.g. the disc is stationary and the plates are rotatable. The plates may be rotatable together or independently from each other.

Second, it will be possible to close the upper compartment from the lower compartment, thereby reducing the risk of moisture reaching the feed in the upper compartment.

Thirdly, it will have a clump reducing effect since there is a strong likelihood that any clumps in the feed will be sheared off by the movement of the disc relative the upper plate.

Furthermore, by providing a spreader motor, a rotatable spreader plate arranged beneath a feed outlet from the lower feed compartment, a spreader shaft between and connected to the spreader motor and to the rotatable spreader plate, the spreader shaft extending at least partly through the lower feed compartment and being oriented to rotate about a second axis oriented with a major component in a vertical direction, and a lower agitator for feed agitation being positioned inside the lower feed compartment and being connected to and extending from the spreader shaft such that when the spreader shaft is rotated the lower agitator will sweep around the second axis inside the lower feed compartment, it becomes possible to provide a spreading of the feed independently of the control of the amount of feed to be spread. Moreover, by providing a lower agitator clumps reduction is further improved.

The lower agitator may comprise a first connecting portion comprising a self-supporting wire being coiled around the spreader shaft. This facilitates the production of the agitator and of the shaft. A coiling of a wire is a convenient production method. By using a wire coiled around the shaft, the shaft need not be provided with any elaborate fastening means.

The lower agitator may further comprise a central portion extending from the first connecting portion and away from spreader shaft. Thereby the central portion may form a wing-like central portion sweeping around the spreader shaft when the spreader shaft is rotated. The central portion may be a part of the wire integrally formed with the first connection portion.

The lower agitator may further comprise a second connecting portion comprising a self-supporting wire being coiled around the spreader shaft. This facilitates the production of the agitator and of the shaft. A coiling of a wire is a convenient production method. By using a wire coiled around the shaft, the shaft need not be provided with any elaborate fastening means.

The first connection portion, the central portion and the second connection portion may be formed of a single wire being coiled in both ends with the central portion comprising a loop extending from the first connection portion in a first direction having a component, preferably a major component, transverse to the axis of the spreader shaft and then back along a second direction having a component, preferably a major component, transverse to the axis of the spreader shaft to the second connection portion.

The wire of the lower agitator may be formed of spring steel. Thereby, the agitator may be deformed to be able to pass any obstruction and to return to its original shape once the obstructions has been passed. Spring steel may e.g. be said to be a steel grade having a yield strength greater than 300 MPa, and preferably greater than 400 MPa.

At the first connection portion, the wire may be coiled around the spreader shaft in a coiling direction such that any obstruction hindering the agitator from sweeping with the rotation of the spreader shaft will cause the first connection portion to tighten around the spreader shaft. Thereby the first connection portion will be able to transfer great loads between the lower agitator and the spreader shaft without introducing a need for a connection being strong from the beginning and thereby often being difficult to mount.

At the second connection portion, the wire may be coiled around the spreader shaft in a coiling direction such that any obstruction hindering the agitator from sweeping with the rotation of the spreader shaft will cause the second connection portion to tighten around the spreader shaft. Thereby the second connection portion will be able to transfer great loads between the lower agitator and the spreader shaft without introducing a need for a connection being strong from the beginning and thereby often being difficult to mount.

At the second connection portion, the wire may be coiled around the spreader shaft in a coiling direction such that any obstruction hindering the agitator from sweeping with the rotation of the spreader shaft will cause the second connection portion to loosen its grip around the spreader shaft. Thereby the spring will at the second connection portion have a tendency to uncoil simultaneously as the first connection portion is coiled onto the spreader shaft, whereby the central portion will move in the same direction along the spreader shaft both at the first and second when an obstruction occurs. This will reduce the risk of any pinching action by the two legs of the central portion from occurring.

The first connection portion may frictionally engage the spreader shaft, whereby the first connection portion is rotatable about the spreader shaft in case the frictional force is overcome. This reduces the risk of the agitator or the motor being damaged in cases there is a clump that the feeder cannot crush or more in a single revolution of the agitator.

The second connection portion may frictionally engage the spreader shaft, whereby the second connection portion is rotatable about the spreader shaft in case the frictional force is overcome. This reduces the risk of the agitator or the motor being damaged in cases there is a clump that the feeder cannot crush or more in a single revolution of the agitator.

However, it may be noted that the connections comprising the coiled wire each has a strong frictional engagement with the shaft and that any obstruction will force the frictional engagement to be even stronger. Thereby, the connection will be strong enough to in most cases cause the agitator to pass the obstruction by bending the central portion of the agitator and by beginning to further coil the first connection portion onto the shaft. When the agitator has passed the obstruction, the agitator will return at least partly, and preferably fully, to its original shape.

The feeder may further comprise a disc motor, a disc shaft between and connected to the disc motor and to the rotatable spreader plates or disc, the disc shaft extending at least partly through the upper feed compartment and being oriented to rotate about the first axis, an upper agitator for feed agitation being positioned inside the upper feed compartment and being connected to and extending from the disc shaft such that when the disc shaft is rotated the upper agitator will sweep around the first axis inside the upper feed compartment.

This will further improve the clump reducing capabilities of the feeder. Moreover, the upper agitator will improve the transfer of feed from the upper compartment into the opening of the disc.

The upper agitator may comprise a connecting portion comprising a self-supporting wire being coiled around the disc shaft. This facilitates the production of the agitator and of the shaft. A coiling of a wire is a convenient production method. By using a wire coiled around the shaft, the shaft need not be provided with any elaborate fastening means.

The upper agitator may further comprise a central portion extending from the connecting portion and away from disc shaft. Thereby the central portion may form a wing-like central portion sweeping around the disc shaft when the disc shaft is rotated. The central portion may be a part of the wire integrally formed with the connection portion.

The wire of the upper agitator may be formed of spring steel. Thereby, the agitator may be deformed to be able to pass any obstruction and to return to its original shape once the obstructions has been passed.

The wire may be coiled around the disc shaft in a coiling direction such that any obstruction hindering the agitator from sweeping with the rotation of the disc shaft will cause the connection portion to tighten around the disc shaft. Thereby the connection portion will be able to transfer great loads between the upper agitator and the disc shaft without introducing a need for a connection being strong from the beginning and thereby often being difficult to mount.

The connection portion of the upper agitator may frictionally engage the disc shaft, whereby the connection portion is rotatable about the disc shaft in case the frictional force is overcome. This reduces the risk of the agitator or the motor being damaged in cases there is a clump that the feeder cannot crush or more in a single revolution of the upper agitator.

The upper plate and the lower plate may be fixed relative to the housing and the disc may be rotatable relative to the housing and relative to the upper and lower plates. This is a convenient manner of designing the feeder. Moreover, the movement of the disc will allow clumps to fall into the opening of the disc and then the edge of the plate will act to shear the clump into pieces.

The at least one opening of the upper plate may be non-overlapping with the at least one opening of the lower plate. This will provide a secure portioning between the upper and lower compartments since there will be no situation when the feed may fall directly between the upper and lower compartment. Moreover, it makes it possible to close the connection between the upper and lower compartments being feeding cycles.

The invention may alternatively in short be said to relate to a feeder for spreading feed, the feeder comprising a housing having an upper feed compartment and a lower feed compartment, and a partition wall between the upper feed compartment and the lower feed compartment, the partition wall comprising an upper plate, a lower plate and a disc with through-going openings, the feeder further comprising a spreader motor, a rotatable spreader plate, a spreader shaft between and connected to the spreader motor and to the rotatable spreader plate, the spreader shaft extending at least partly through the lower feed compartment and a lower agitator being positioned inside the lower feed compartment and being connected to and extending from the spreader shaft such that when the spreader shaft is rotated the lower agitator will sweep around the second axis inside the lower feed compartment.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
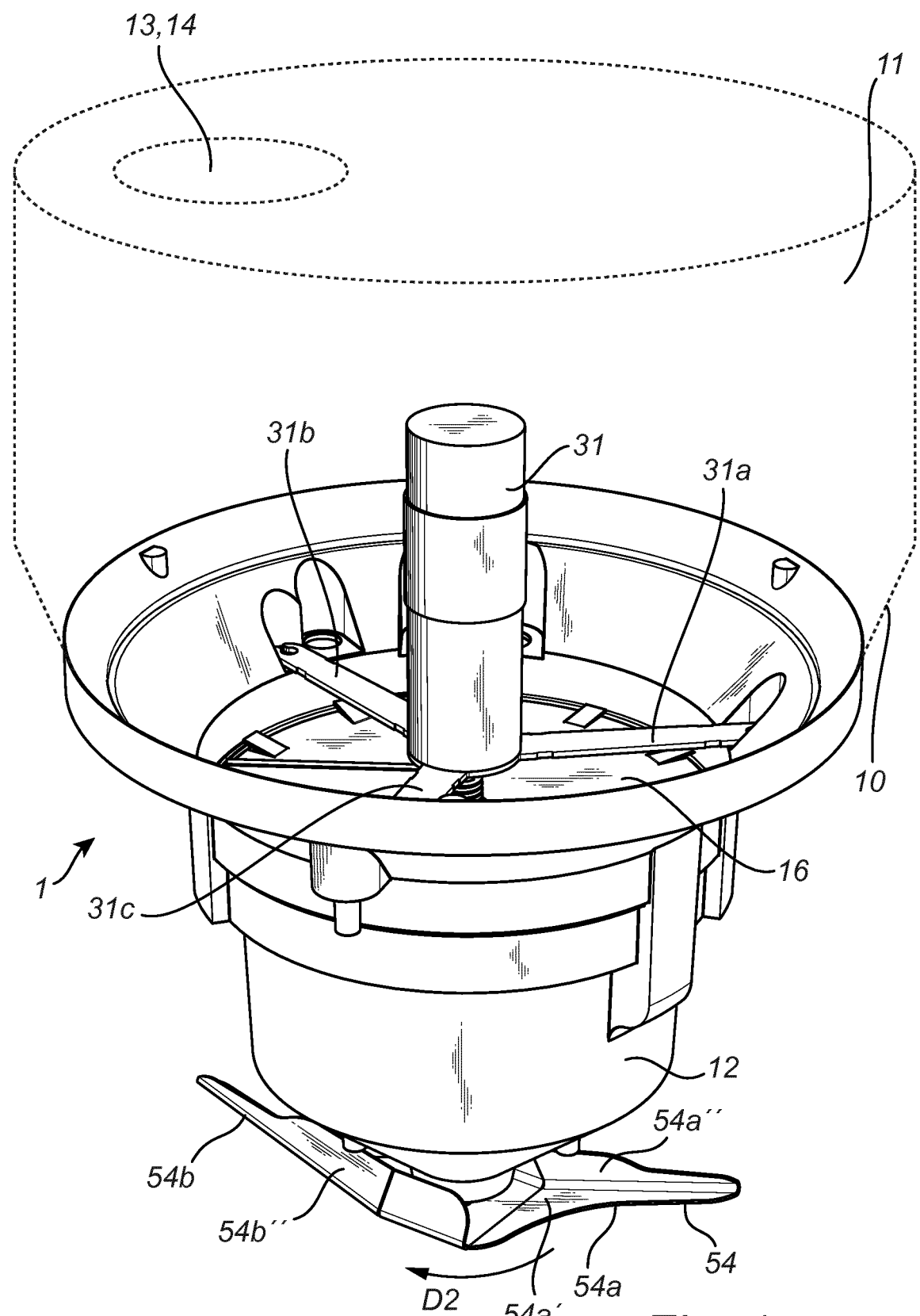
FIG. 1 is a perspective view of a feeder.

As shown in FIG. 1, the feeder 1 generally comprises a housing 10. The housing 10 has, or may be said to be divided into, an upper feed compartment 11 and a lower feed compartment 12.

The feeder 1 is adapted to be loaded with feed in the upper feed compartment 11. This may e.g. be performed by removing the lid 13 exposing the opening 14 in the top wall 15 of the housing 10. The loading of feed into the feeder 1 may be performed in other ways. It may e.g. be performed by a tubing system where a central storage of feed supplies one or more feeders 1 of the kind shown in the figures. The feeder 1 is advantageously intended to be operated in a mode where feed is provided in the upper compartment 11 before it is activated to spread the feed.

Figure 3:
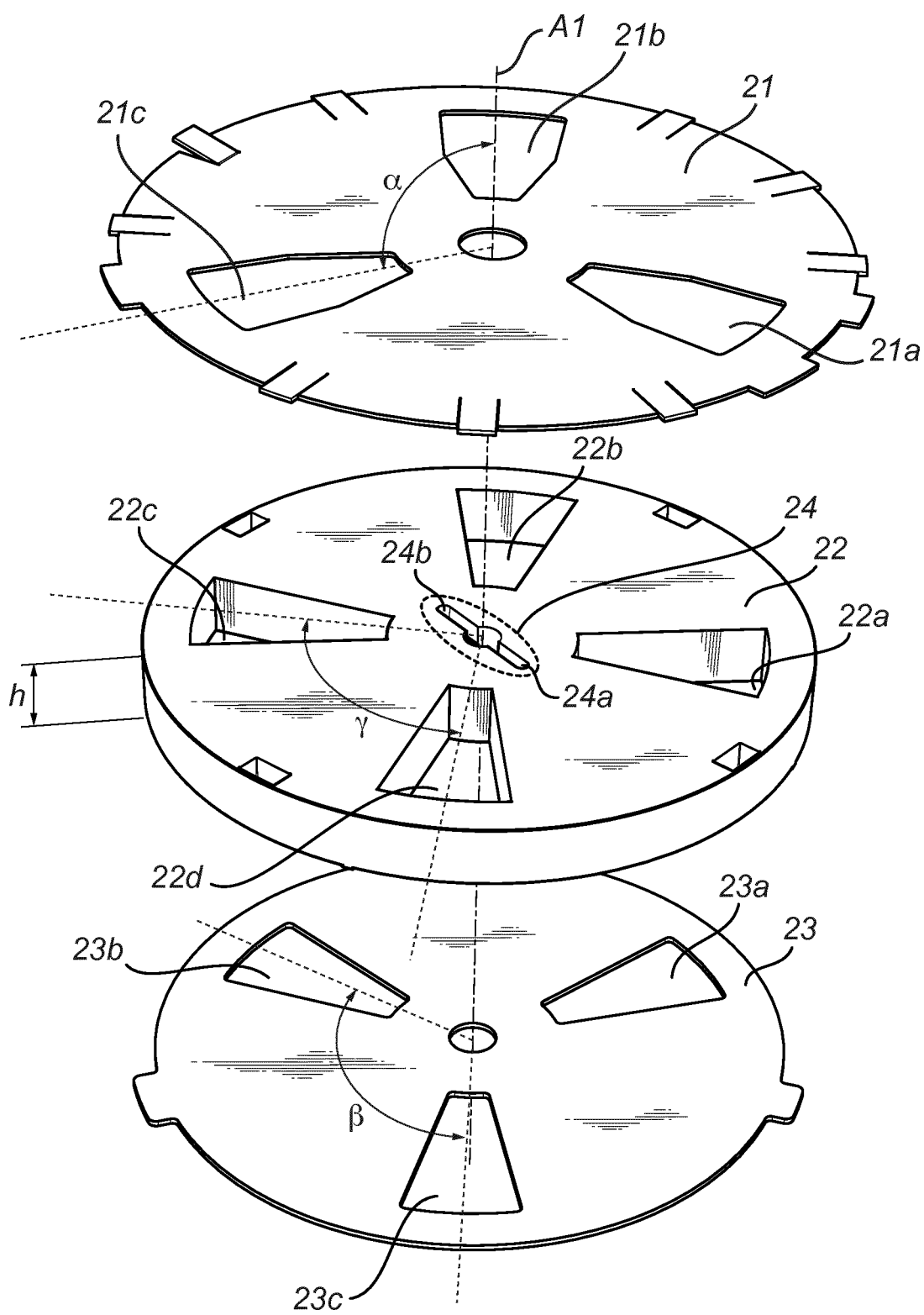
FIG. 3 is an exploded view in perspective of an upper plate, a disc and a lower plate.

As shown in FIG. 1, the feeder 1 further comprises a partition wall 16 between the upper feed compartment 11 and the lower feed compartment 12. It may also be said that the partition wall 16 forms, or at least forms part of, the bottom of the upper feed compartment 11. The lower wall portion 11*b* of the upper feed compartment 11 is shaped with inclined surfaces forming a perimeter of the bottom portion of the lower feed compartment 12 into a funnel directing feed down to the partition wall 16. The partition wall 16 comprises an upper plate 21, a disc 22, and a lower plate 23. The upper plate 21 has at least one through-going opening 21*a-c*. It is preferred that the upper plate 21 comprises a plurality, i.e. two or more through-going openings 21*a-b*. In the preferred embodiment shown in the figures, the upper plate 21 comprises three through-going openings 21*a-c*. The through-going openings 21*a-c* of the upper plate 21 are preferably arranged evenly distributed over the 360° around a first axis A1. That is, the angle α between a central line through the respective through-going opening is 360/n, where n is the number of through-going openings. In the embodiment of FIG. 3, n equals 3 and the angle α equals 120°.

The lower plate 23 has at least one through-going opening 23a-c. It is preferred that the lower plate 23 comprises a plurality, i.e. two or more through-going openings 23a-b. In the preferred embodiment shown in the figures, the lower plate 23 comprises three through-going openings 23a-c. The through-going openings 23a-c of the lower plate 23 are preferably arranged evenly distributed over the 360° around the first axis A1. That is, the angle β between a central line through the respective through-going opening is 360/n, where n is the number of through-going openings. In the embodiment of FIG. 3, n equals 3 and the angle β equals 120°.

In the preferred embodiment, the upper and lower plates 21, 23 are formed of sheet metal. This is a wear resistant material and it is convenient to produce the through-going openings by e.g. punching out the openings.

The disc 22 is arranged between the upper and lower plates 21, 23. The disc 22 has a height h and at least one through-going opening 22a-d. It is preferred that the disc 22 comprises a plurality, i.e. two or more through-going openings 22a, 22c. In the preferred embodiment shown in the figures, the disc 22 comprises four through-going openings 22a-d. The through-going openings 22a-d of the disc 22 are preferably arranged evenly distributed over the 360° around the first axis A1. That is, the angle γ between a central line through the respective through-going opening is 360/n, where n is the number of through-going openings. In the embodiment of FIG. 3, n equals 4 and the angle γ equals 90°. Since the disc 22 has a height h, there will be formed a plurality of compartments each having the volume determined by the mouth area of respective opening 22a-d times the height h. By rotation of the disc 22 there will be transferred a well-controlled amount of feed per every time such a compartment passes the openings 21a-c in the upper plate 21 and the openings 22a-c in the lower plate 22. The exact choice of the height h is dependent upon e.g. the different amounts of feed the feeder is designed to transfer. A greater height h will allow a greater amount to be transferred in respective compartment. A smaller height h will increase the likelihood that the disc 23 and upper plate 21 together will shear clumps.

The feeder 1 further comprises a disc motor 30. The disc motor 30 is fixedly supported by the housing 10. In the preferred embodiment the disc motor 30 is supported by arms 31a-c connected on the one hand in the housing 10 and on the other hand to the disc motor 30. The disc motor 30 may be fixedly attached to the housing 10 in other manners. It may e.g. be fixedly supported by the top wall 15 of the housing 10.

A disc shaft 32 connected to the disc motor 30 extends between the disc motor 30 and the disc 22. The disc shaft 32 is rotated by the disc motor 30 and thereby the disc 22 is rotated. The disc shaft 32 is e.g. provided with a set of pins 33a, 33b. The pins 33a, 33b each has an extension, and preferably extends, in a direction transverse to the first axis A1. The disc 22 has a shaft connection portion 24 comprising an opening with a non-circular shape. In the preferred embodiment the pins 33a-b are received in wing-shaped portions 24a-b of the connection portion 24 whereby the shaft 32 is rotationally fixed relative to the disc 22. Other embodiments conceived are e.g. the provision of a non-circular shaft adapted to non-rotationally interact with a non-circular opening in the connection portion. This may e.g. be performed with the shaft and the opening forming a splines connection. The shaft and the opening may alternatively be formed as a polygon, such as a square or a hexagon. Other shapes such as so-called Torque or Philips connections used for screws and screw drivers are also conceivable.

The disc shaft 32 extends at least partly through the upper feed compartment 11. The disc shaft 32 is oriented to rotate about the first axis A1.

Figure 4:
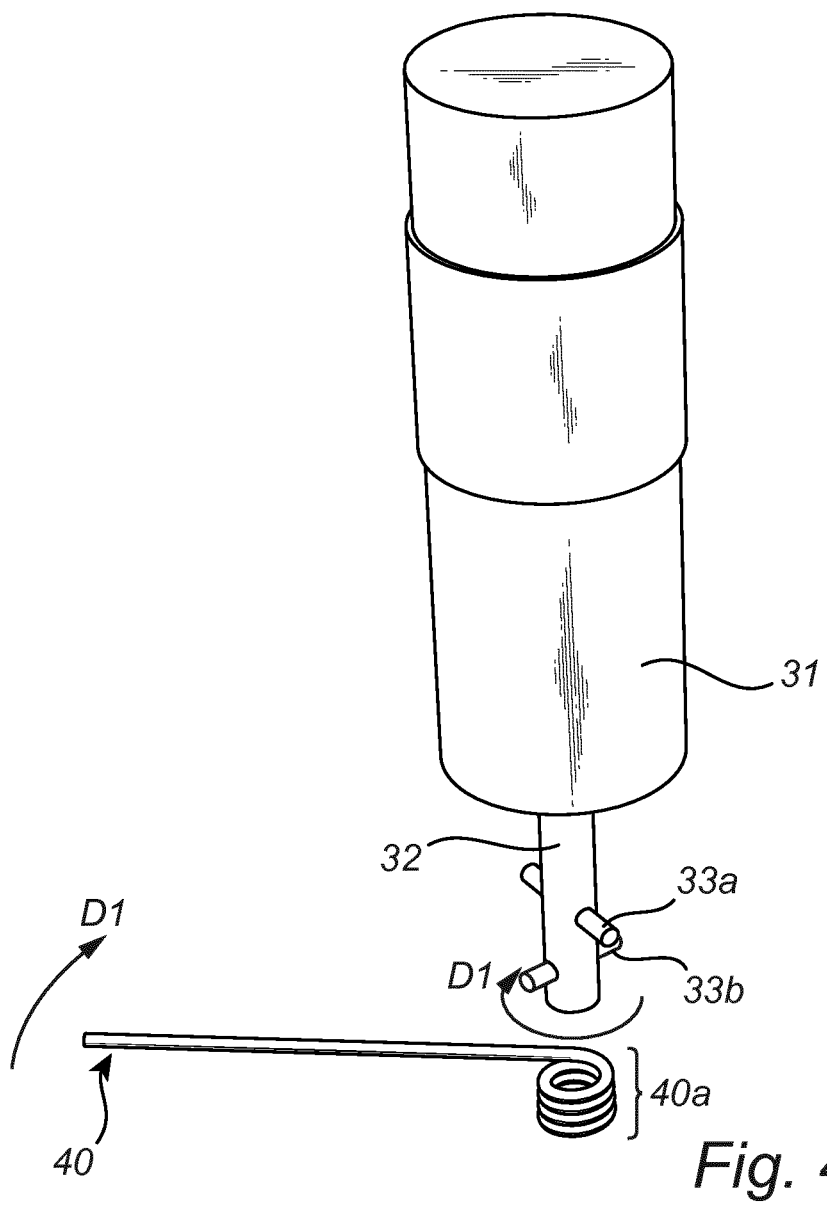
FIG. 4 is an exploded view of a disc motor and an upper agitator adapted to be trained onto the shaft of the disc motor.
Figure 5:
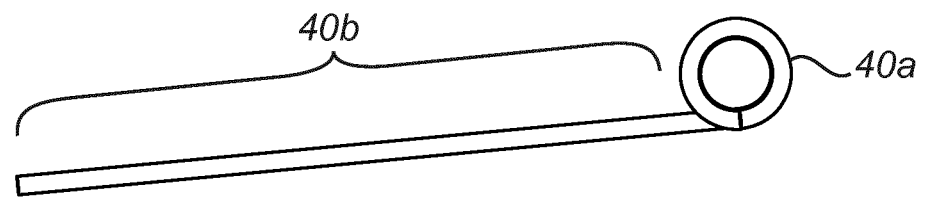
FIG. 5 is a view of the agitator of FIG. 4 as seen from below of FIG. 4.

As shown in detail in FIG. 4 and FIG. 5, the feeder 1 further comprises an upper agitator 40 for feed agitation in the upper feed compartment 11. The upper agitator 40 is positioned inside the upper feed compartment 11. The upper agitator 40 is connected to and extending from the disc shaft 32 such that when the disc shaft 32 is rotated the upper agitator 40 will sweep around the first axis A1 inside the upper feed compartment 11.

Figure 2:
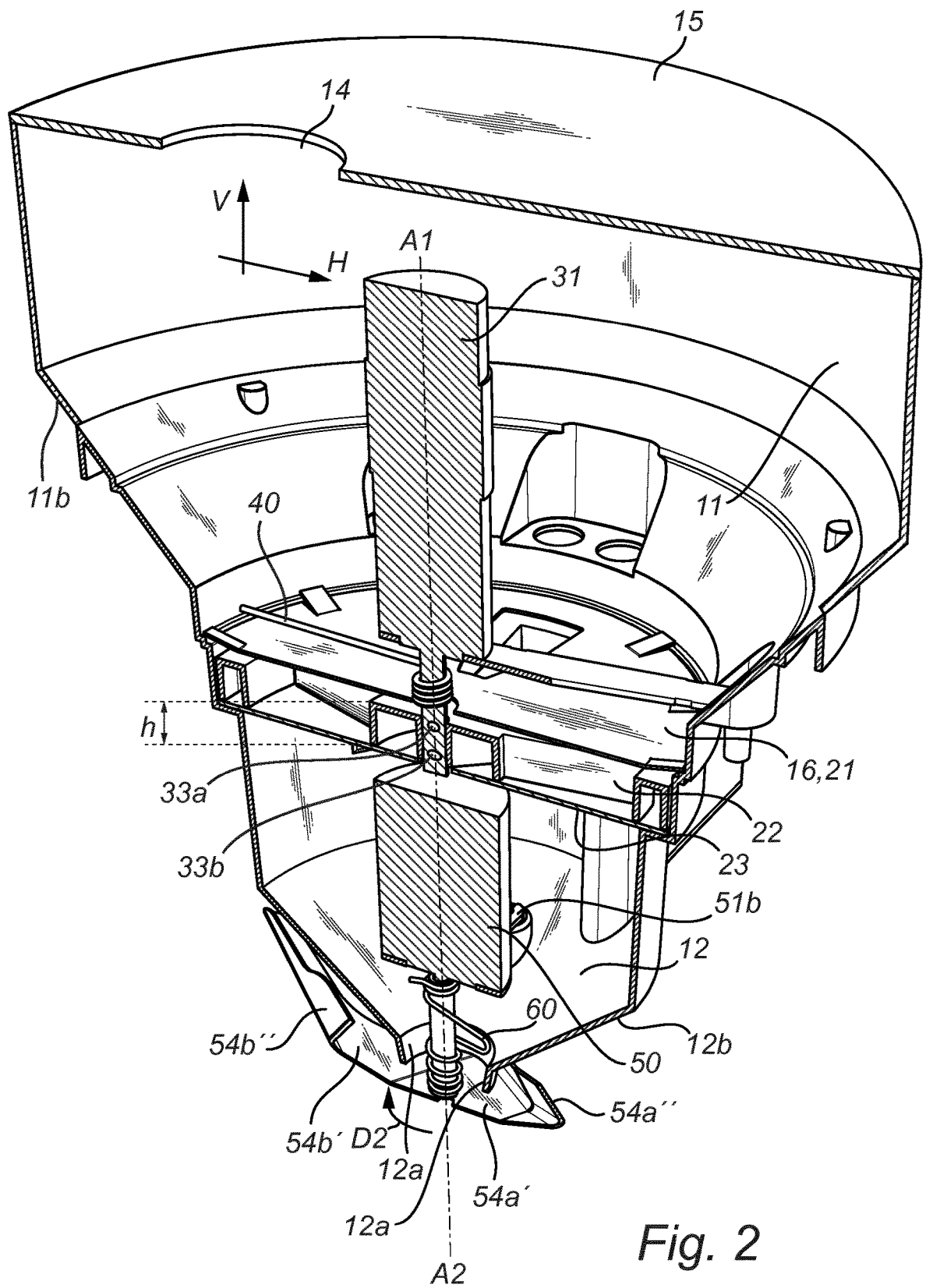
FIG. 2 is a cross-section corresponding to FIG. 1.

As shown in FIG. 4 and FIG. 2, the upper agitator 40 comprises a connecting portion 40a comprising a self-supporting wire being coiled around the disc shaft 32. The upper agitator 40 further comprises a central portion 40b extending from the connecting portion 40a and away from disc shaft 32. Thereby the central portion 40b may form a wing-like central portion sweeping around the disc shaft 32 when the disc shaft 32 is rotated. The central portion 40b is in the preferred embodiment integrally formed with the wire forming the connection portion 40a.

The wire of the upper agitator may be formed of spring steel. The spring steel may e.g. be a steel grade having a yield strength greater than 300 MPa, and preferably greater than 400 MPa. The wire 40a is preferably coiled around the disc shaft 32 in a coiling direction such that any obstruction hindering the agitator 40 from sweeping with the rotation of the disc shaft 32 will cause the connection portion 40a to tighten around the disc shaft 32. The direction of the coil 40a is shown in FIG. 4. The rotational direction D1 of the disc shaft 32 is indicated in FIG. 4.

It may be noted that it is not important if the coil 40a has a pitch upwardly or downwardly in FIG. 4. In order to provide the tightening effect the central portion 40b extends in accordance with the preferred embodiment away from the coil 40a in the forward side of the coil 40a such that any hindering against movement along D1 will cause the central portion 40a to bend slightly as if it would continue to be coiled around the disc shaft 32.

The connection portion 40a of the upper agitator 40 may frictionally engage the disc shaft 32. The connection portion 40a is rotatable about the disc shaft 32 in case the frictional force is overcome.

The upper plate 21 and the lower plate 23 may be fixed relative to the housing 10. The disc 22 may be rotatable relative to the housing 10 and relative to the upper and lower plates 21, 23. The movement of the disc 22 will allow clumps in the feed to fall into the openings 22a-d of the disc 22 and then the hole edge of the openings 21a-c in the upper plate 21 will act to shear the clumps into pieces.

As shown in FIG. 3, the angular positions, about the first axis A1, of the at least one opening 21a-c of the upper plate 21 are non-overlapping with the at least one opening 23a-c of the lower plate 23. This will provide a secure portioning between the upper and lower compartments 11, 12 since there will be no situation when the feed may fall directly between the upper compartment 11 and lower compartment 12.

Feed is transferred from the upper compartment 11 to the lower compartment 12 by rotating the disc 22. As mentioned above, the disc 22 is rotatable about the first axis A1. This provides a relative rotation between the upper and lower plates 21, 23 on one hand and the disc 22 on the other hand. The first axis A1 is oriented with a major component in a vertical direction V. In the preferred embodiment the first axis A1 is arranged in the vertical direction V. By having a first axis at least having a major component along the vertical direction feed may be transferred from the upper feed compartment 11 to the lower feed compartment 12 by use of gravity and the apparatus may be design in a compact manner. Feed is transferred to the through-going opening 22a-d of the disc 22 when the through-going opening 22a-d of the disc 22 at least partly overlaps with the through-going opening 21a-c of the upper plate 21. Feed is transferred to the lower feed compartment 12 when the through-going opening 22a-d of the disc 22 at least partly overlaps with the through-going opening 23a-c of the lower plate 23.

Figure 6:
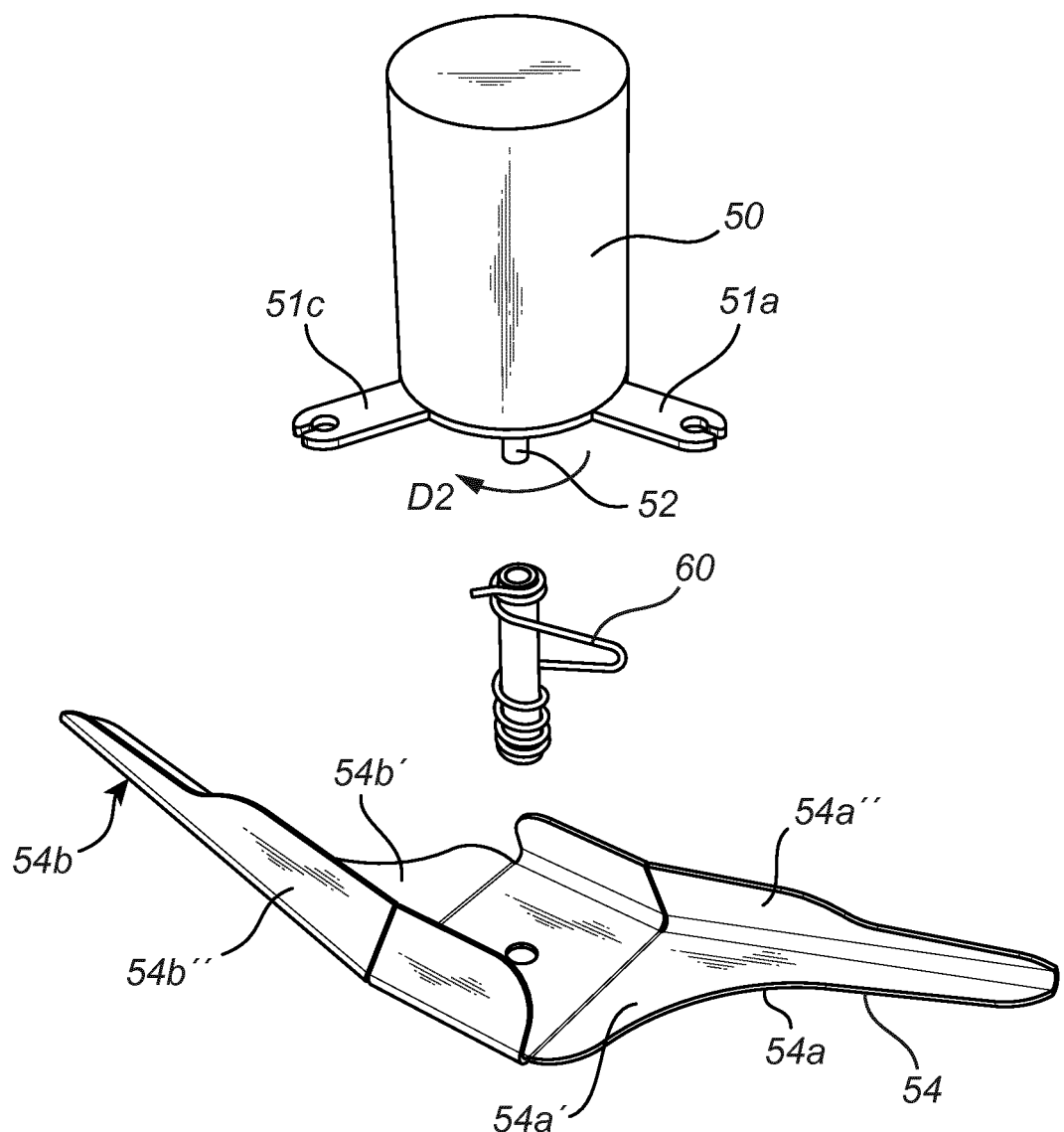
FIG. 6 is an exploded view of a spreader motor, a shaft adapted to be connected to the motor, a lower agitator and spreader plate.
Figure 7:
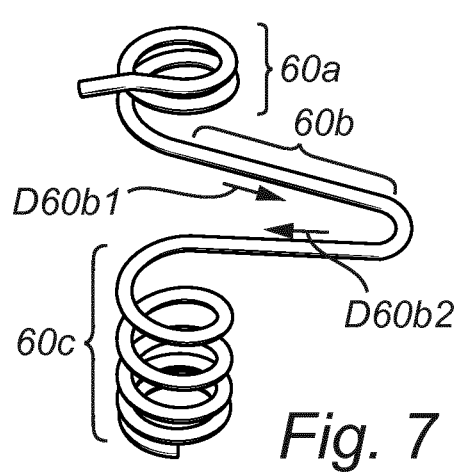
FIG. 7 is a view in perspective of the lower agitator shown in FIG. 6.

As shown in FIGS. 1-2 and further elaborated with reference to FIGS. 6 and 7, the feeder 1 further comprises a spreader motor 50. The spreader motor 50 is fixedly attached to the housing 10.

In the preferred embodiment the spreader motor 50 is supported by arms 51a-c connected on the one hand in the housing 10 and on the other hand to the spreader motor 50. The spreader motor 50 may be fixedly attached to the housing 10 in other manners. It may e.g. be fixedly supported by the lower plate 23.

The feeder 1 further comprises a spreader shaft 52 adapted to be rotated by the spreader motor 50. The feeder further comprises a rotatable spreader plate 54 arranged beneath a feed outlet 12a from the lower feed compartment 12. In the disclosed embodiment, the feed outlet 12a is formed as an opening at the bottom of the lower feed compartment 12. It may be noted that the lower most portion or bottom wall 12b of the lower feed compartment 12 is shaped with inclined surfaces forming the bottom portion of the lower feed compartment 12 into a funnel directing feed down to the feed outlet 12a.

The spreader shaft 52 extends out of the lower feed compartment 12 via the feed outlet 12a. The spreader shaft 52 extends between and is connected to the spreader motor 50 and to the rotatable spreader plate 54. As shown in FIG. 2, the spreader shaft 52 extends at least partly through the lower feed compartment 12 and is oriented to rotate about a second axis A2. The second axis A2 is oriented with a major component in the vertical direction V. In the preferred embodiment is the second axis A2 oriented along the vertical direction V. In the preferred embodiment is the first and second axes A1, A2 oriented along a common line. This common line is preferably oriented along the vertical direction V. In an alternative design is the first and second axes A2, A2 both oriented along the vertical direction V but offset each other in a horizontal direction H.

A lower agitator 60 for feed agitation is positioned inside the lower feed compartment 12. The lower agitator 60 is connected to and extending from the spreader shaft 52 such that when the spreader shaft 52 is rotated, the agitator 60 will sweep around the second axis A2 inside the lower feed compartment 12.

The lower agitator 60 may comprise a first connecting portion 60a comprising a self-supporting wire being coiled around the spreader shaft 52. The wire of the lower agitator 60 may further comprise a central portion 60b extending from the first connecting portion 60a and away from spreader shaft 52. Thereby the central portion may be said to form a wing-like central portion 60b sweeping around the spreader shaft 52 when the spreader shaft 52 is rotated. The central portion 60b may be a part of the wire integrally formed with the first connection portion 60a.

The lower agitator 60 may further comprise a second connecting portion 60c comprising a self-supporting wire being coiled around the spreader shaft 52.

The first connection portion 60a, the central portion 60b and the second connection portion 60c may be formed of a single wire being coiled in both ends with the central portion 60b comprising a loop extending from the first connection portion 60a in a first direction D60b1 having a component, preferably a major component, transverse to the axis A2 of the spreader shaft 52 and then back along a second direction D60b2 having a component, preferably a major component, transverse to the axis A2 of the spreader shaft 52 to the second connection portion 60c.

The wire of the lower agitator 60 may be formed of spring steel. The spring steel may e.g. be a steel grade having a yield strength greater than 300 MPa, and preferably greater than 400 MPa. The agitators 40, 60 may e.g. be shaped into the desired shape and then heated to e.g. about 300° C. to relax internal tension from the shaping process. This heat treatment may be performed with the agitator already placed on the respective shaft, such that the coil of the wire may shrink somewhat into stronger engagement with the shaft than the engagement after mounting but before heat treatment.

At the first connection portion 60a, the wire may be coiled around the spreader shaft 52 in a coiling direction such that any obstruction hindering the lower agitator 60 from sweeping with the rotation of the spreader shaft 52 will cause the first connection portion 60a to tighten around the spreader shaft 52. This coiling direction is shown in FIG. 6 in relation to the rotational direction D2 of the spreader shaft 52.

At the second connection portion 60c, the wire may be coiled around the spreader shaft 52 in an opposite coiling direction such that any obstruction hindering the lower agitator 60 from sweeping with the rotation of the spreader shaft 52 will cause the second connection portion 60c to loosen its grip around the spreader shaft. This coiling direction is shown in FIG. 6 in relation to the rotational direction D2 of the spreader shaft 52.

The first connection portion 60a may frictionally engage the spreader shaft 52. The first connection portion 60a is rotatable about the spreader shaft 52 in case the frictional force is overcome.

The second connection portion 60c may frictionally engage the spreader shaft 52. The second connection portion 60c is rotatable about the spreader shaft 52 in case the frictional force is overcome.

The spreader plate 54 comprises a plurality of wings, in the preferred embodiment two wings 54a, 54b. The wings 54a, 54b extend transversely to the axis A2 of rotation. Each wing 54a, 54b comprises a bottom surface 54a', 54b' onto which the feed drops when falling out of the feed outlet 12a. Each wing 54a, 54b further comprises a wall 54a", 54b" extending upwardly from the respective bottom surface 54a', 54b'. The wall 54a", 54b" is positioned along a trailing edge of the respective bottom surface 54a', 54b', trailing in view of the rotation D2 of the spreader plate 54. The spreader plate 54 is intended to be rotated with a rotational speed sufficient to through the feed outwardly by centrifugal forces from the walls 54a", 54b" acting onto the feed on the bottom surfaces 54a', 54b'. In the preferred embodiment, the bottom surfaces 54a', 54b' have a small inclination upwardly along the extension away from the spreader shaft 52.

It is contemplated that there are numerous modifications of the embodiments described herein, which are still within the scope of the invention as defined by the appended claims.

At the second connection portion 60c, the wire may alternatively be coiled around the spreader shaft 52 in a coiling direction (not shown) such that any obstruction hindering the lower agitator from sweeping with the rotation of the spreader shaft will cause the second connection portion to tighten its grip around the spreader shaft.

The invention claimed is:

1. A feeder for spreading feed, the feeder comprising a housing having
an upper feed compartment and
a lower feed compartment,
wherein the feeder is adapted to be loaded with feed in the upper feed compartment,
the feeder further comprising a partition wall between the upper feed compartment and the lower feed compartment, the partition wall comprising
an upper plate having at least one through-going opening,
a lower plate having at least one through-going opening,
and a disc having a height and at least one through-going opening, the disc being arranged between the upper and lower plates,
whereby relative rotation between the upper and lower plates and the disc about a first axis oriented with a major component in a vertical direction allows feed to be transferred from the upper feed compartment to the lower feed compartment, wherein the feed is transferred to the through-going opening of the disc when the through-going opening of the disc at least partly overlaps with the through-going opening of the upper plate, wherein the feed is transferred to the lower feed compartment when the through-going opening of the disc at least partly overlaps with the through-going opening of the lower plate,
the feeder further comprising
a spreader motor,
a rotatable spreader plate arranged beneath a feed outlet from the lower feed compartment,
a spreader shaft between and connected to the spreader motor and to the rotatable spreader plate, the spreader shaft extending at least partly through the lower feed compartment and being oriented to rotate about a second axis oriented with a major component in a vertical direction,
a lower agitator for feed agitation, the lower agitator being positioned inside the lower feed compartment and being connected to and extending from the spreader shaft such that when the spreader shaft is rotated the lower agitator will sweep around the second axis (A2) inside the lower feed compartment, wherein the lower agitator comprises a first connecting portion comprising a self-supporting wire being coiled around the spreader shaft.

2. The feeder according to claim 1, wherein the lower agitator further comprises a central portion extending from the first connecting portion and away from spreader shaft.

3. The feeder according to claim 1, wherein the lower agitator further comprises a second connecting portion comprising a self-supporting wire being coiled around the spreader shaft.

4. The feeder according to claim 1, wherein the wire of the lower agitator is formed of spring steel.

5. The feeder according to claim 1, wherein, at the first connection portion, the wire is coiled around the spreader shaft in a coiling direction such that any obstruction hindering the lower agitator from sweeping with the rotation of the spreader shaft will cause the first connection portion to tighten around the spreader shaft.

6. The feeder according to claim 1, wherein the first connection portion frictionally engages the spreader shaft, whereby the first connection portion is rotatable about the spreader shaft in case the frictional force is overcome.

7. The feeder according to claim 1, wherein the feeder further comprises
a disc motor,
a disc shaft between and connected to the disc motor and to the rotatable spreader plates or disc, the disc shaft extending at least partly through the upper feed compartment and being oriented to rotate about the first axis,
an upper agitator for feed agitation, the upper agitator being positioned inside the upper feed compartment and being connected to and extending from the disc shaft such that when the disc shaft is rotated the upper agitator will sweep around the first axis inside the upper feed compartment.

8. The feeder according to claim 7, wherein the upper agitator comprises a connecting portion comprising a self-supporting wire being coiled around the disc shaft.

9. The feeder according to claim 8, wherein the upper agitator further comprises a central portion extending from the connecting portion and away from disc shaft.

10. The feeder according to claim 8, wherein the wire is coiled around the disc shaft in a coiling direction such that any obstruction hindering the upper agitator from sweeping with the rotation of the disc shaft will cause the connection portion to tighten around the disc shaft.

11. The feeder according to claim 8, wherein the connection portion of the upper agitator frictionally engages the disc shaft, whereby the connection portion is rotatable about the disc shaft in case the frictional force is overcome.

12. The feeder according to claim 7, wherein the wire of the upper agitator is formed of spring steel.

13. The feeder according to claim 1, wherein the upper plate and the lower plate are fixed relative to the housing and the disc is rotatable relative to the housing and relative to the upper and lower plates.

14. The feeder according to claim 1, wherein the at least one opening of the upper plate is non-overlapping with the at least one opening of the lower plate.

* * * * *